L. BEEMAN.
LATHE CENTER.
APPLICATION FILED APR. 14, 1919. RENEWED MAY 12, 1921.
1,399,921.
Patented Dec. 13, 1921.
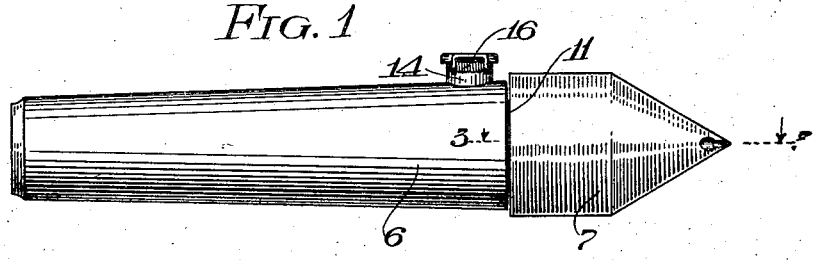
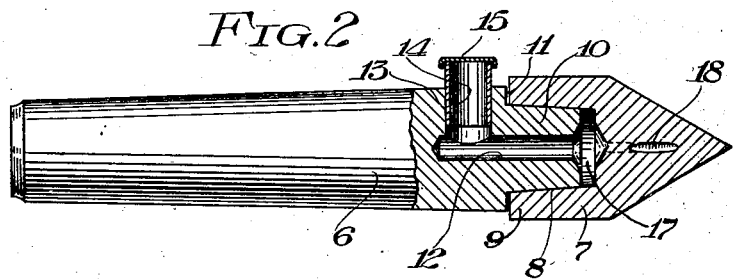
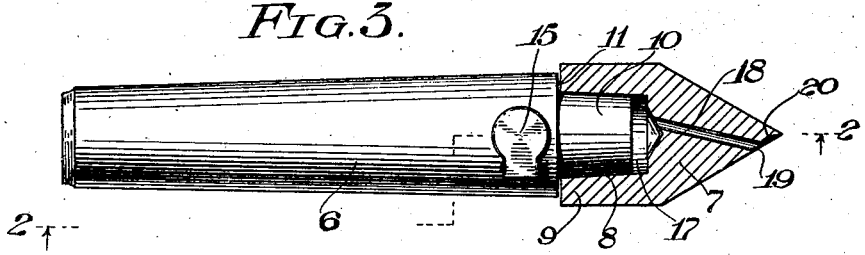
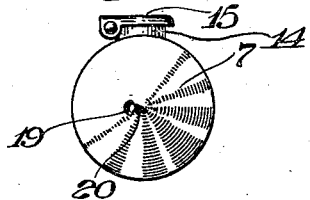
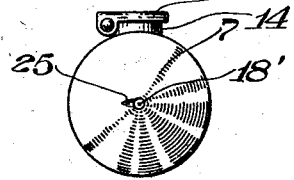
WITNESSES.
INVENTOR
Lyle Beeman
By R. S. Caldwell
ATTORNEY.

UNITED STATES PATENT OFFICE.

LYLE BEEMAN, OF MILWAUKEE, WISCONSIN, ASSIGNOR TO MANUFACTURERS' HARDWARE CORPORATION, OF MILWAUKEE, WISCONSIN, A CORPORATION OF WISCONSIN.

LATHE-CENTER.

1,399,921.  Specification of Letters Patent.  Patented Dec. 13, 1921.

Application filed April 14, 1919, Serial No. 289,908. Renewed May 12, 1921. Serial No. 468,977.

*To all whom it may concern:*

Be it known that I, LYLE BEEMAN, a citizen of the United States, and resident of Milwaukee, in the county of Milwaukee and State of Wisconsin, have invented new and useful Improvements in Lathe-Centers, of which the following is a description, reference being had to the accompanying drawings, which are a part of this specification.

The invention relates to lathe-centers and has for its object to produce a construction which will conserve the time of the lathe operator and will save material ordinarily wasted in devices of this kind.

The usual form of lathe-center is made in one piece of tool steel. Unless care is taken to oil the center hole in the material before putting the work on the lathe, and at intervals during the turning of the piece, the point burns off and this necessitates regrinding the lathe-center for a new point. But the frequent regrinding wears down the center to such an extent that the shank portion has to be thrown away and is therefore wasted. To obviate these difficulties I have provided a lathe-center in which a tool steel point is removably secured to a machine steel shank and an oil reservoir is formed in the shank and connects with the point through a conduit so that the center hole in the material will be automatically oiled during the turning operation, thus saving the time ordinarily consumed in oiling the center hole in the material before and during the turning operation, and also saving the material of the center itself by using renewable points with a common shank, the shank being of less expensive material.

A further object of the invention is to provide an efficient connection between the renewable point and the shank which will properly distribute the thrust from the point to the shank and will also permit of ready removal of the point from the shank.

The invention further consists in the several features hereinafter described and more particularly defined by claims at the conclusion hereof.

In the drawings: Figure 1 is a side view of the device embodying the invention; Fig. 2 is a section taken on the line 2—2 of Fig. 3; Fig. 3 is a top view of the device with a section through the head taken on the line 3—3 of Fig. 1; Fig. 4 is an end view of the device; Fig. 5 is an end view of the device used for small work.

In the drawings the numeral 6 designates the shank of the lathe-center, which is preferably made of machine steel, and 7 a renewable point. To connect the parts 6 and 7 together so that the point may be readily removed and so that the same may be securely held on the shank when in use and properly transmit the thrust from the work to the shank, said point is provided with a tapered bore 8 in its rear end 9 and the shank is provided with a correspondingly tapered projection 10 fitting in the bore 8 and a shoulder portion 11. The taper fit between these parts should be such as to permit easy removal of the point from the shank so that the points may be interchanged without excessive binding and at the same time it should be sufficient to hold the point on the shank against rotation during the turning operation, and I have found that a taper of about twelve and one-half degrees is very satisfactory.

The taper fit is such that the end of the point is slightly spaced from the shouldered portion 11 of the shank until the tail-stock carrying the center is brought up against the work and then the rear end of the point 7 abuts against the shoulder 11 so that the thrusts transmitted to the point will be transmitted both to the tapered portion and shouldered portion of the shank and thus prevent wear of the tapered connection between the parts 6 and 7. With this construction, as soon as the point wears down it may be readily replaced, the point being preferably made of tool steel. The connection also has the advantage of permitting the removal of the point without the necessity of removing the shank of the center from the tail-stock of the lathe.

To prevent burning of the point and also to save time, an oil reservoir 12 is formed in the shank by providing a bore therein and a conduit 13 communicates with the inner end of the reservoir and has a filling tube 14 tightly fitted therein, which tube carries a hinged cap 15 provided with a spring hinge 16 so as to prevent any dust or foreign matter from entering into the reservoir. The reservoir 12 communicates with the space 17 between the end of the tapered bore 8 in the point and the end 10, and the oil in the reservoir is conducted to the point through a conduit 18. For large work this conduit is inclined from the axis of the point and terminates at a short distance below and to one side of the tip of the point, as shown at 19 in Fig. 3, and a small groove 20 connects the outlet of the conduit with the tip of the point. In using a center of this kind the oil outlet is disposed at the side opposite to the cutting tool so that the pressure exerted upon the material being turned by the tool will not prevent the flow of oil from the lathe-center to the center hole in the material being turned and there is a constant flow of oil from the reservoir 12 through the point to the work.

For small work the point is so small that the conduit for conducting the oil through the point cannot be led off at one side thereof, and consequently in this case the conduit 18' passes through the point and a short groove 25 leads from the point at one side. The action of this smaller device is the same as that previously described and the groove 25 is similarly disposed opposite to the pressure being exerted upon the work.

The groove adjacent the conduit in each case allows the oil to flow back to some extent from the point. With this construction, on the filling of the oil reservoir through the tube 14 the operator does not have to oil up the center hole of the stock before starting operations, nor does he subsequently have to stop work and oil up the center to prevent burning of the lathe-center point as there is a constant flow of oil furnished to the point and when the point becomes dull or worn down it may be readily replaced by a new one.

What I claim as new and desire to secure by Letters Patent is:

1. In a lathe-center, the combination of a shank provided with a tapered end and a shouldered portion adjacent said tapered end, a renewable point provided with a tapered bore into which said tapered end fits, the end of the point adjacent said bore abutting against said shouldered portion when the point is held to the work, and means for furnishing oil to the tip of the point.

2. In a lathe-center, the combination of a shank having a tapered end with a shouldered portion adjacent thereto, a bore in said tapered end forming an oil reservoir, a filling opening for said reservoir provided with a dustproof cap, a renewable point having a tapered bore fitting on the tapered end of the shank and having its end adjacent said bore adapted to abut against the shouldered portion of the shank, the tapered bore in the point communicating with the reservoir in the shank, and a conduit for conducting oil from the reservoir through the point to the outer end thereof.

In testimony whereof, I affix my signature, in presence of two witnesses.

LYLE BEEMAN.

Witnesses:
 R. S. C. CALDWELL,
 H. D. CHASE.